United States Patent
Tanigawa et al.

(10) Patent No.: US 6,699,923 B2
(45) Date of Patent: Mar. 2, 2004

(54) FLAME-RETARDANT POLYACETAL RESIN COMPOSITION

(75) Inventors: Yukio Tanigawa, Kurashiki (JP); Hidehiko Yamatou, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 281 days.

(21) Appl. No.: 09/862,726

(22) Filed: May 23, 2001

(65) Prior Publication Data

US 2002/0004545 A1 Jan. 10, 2002

(30) Foreign Application Priority Data

May 24, 2000 (JP) .......................................... 2000-152551

(51) Int. Cl.[7] .......................... C08K 3/32; C08K 5/098; C08K 3/34; C08K 9/00; C08L 61/02
(52) U.S. Cl. ........................ 524/414; 524/394; 524/400; 524/492; 524/592; 524/594; 523/206
(58) Field of Search ............................... 524/414, 492, 524/592, 594, 394, 400; 523/206

(56) References Cited

U.S. PATENT DOCUMENTS

| | | | |
|---|---|---|---|
| 4,208,317 A | * | 6/1980 | Cerny et al. |
| 5,162,428 A | * | 11/1992 | Katoh et al. |
| 5,364,899 A | * | 11/1994 | Watanabe et al. |
| 5,559,180 A | * | 9/1996 | Takahashi et al. |
| 6,103,828 A | * | 8/2000 | Kobayashi et al. |
| 6,130,282 A | * | 10/2000 | Imahashi et al. |
| 6,329,451 B2 | * | 12/2001 | Matsumoto et al. |

FOREIGN PATENT DOCUMENTS

| | | |
|---|---|---|
| EP | 0 338 303 A2 | 10/1989 |
| JP | 48-7044 | 1/1973 |
| JP | 49-42662 | 11/1974 |
| JP | 55-84348 | 6/1980 |
| JP | 2001-72830 | 3/2001 |
| WO | 01/05888 | 1/2001 |

* cited by examiner

Primary Examiner—Tae H. Yoon
(74) Attorney, Agent, or Firm—Birch, Stewart, Kolasch & Birch, LLP

(57) ABSTRACT

A flame-retardant polyacetal resin composition comprising 60 to 90% by weight of a polyacetal resin, 1 to 30% by weight of red phosphorus, 1 to 40% by weight of at least one resin selected from phenol resins and polycarbonate resins, and 0.1 to 5% by weight of a metal salt of a fatty acid. The polyacetal resin composition of the present invention is provided with flame retardancy while maintaining the excellent innate properties of polyacetal resins, so that it can be applied to the fields where the use of polyacetal resins has been restricted.

12 Claims, No Drawings

FLAME-RETARDANT POLYACETAL RESIN COMPOSITION

BACKGROUND OF THE INVENTION

The present invention relates to a polyacetal resin composition with excellent flame retardancy, more particularly to a flame-retardant polyacetal resin composition having excellent thermal stability and mechanical properties.

Polyacetal resins are used in a wide sphere of industrial products, most typically automobile and OA equipment parts, as an engineering resin with a good balance of mechanical properties and excellent moldability. However, since polyacetal resins are combustible, their use is limited in applications where flame retardancy is required. So, presently, other types of resins provided with flame retardancy are used for such applications.

Various methods have been proposed for affording flame retardancy to polyacetal resins.

For example, JP-B-43-22671 proposes the addition of ammonium phosphate to polyacetal resins, and JP-B-53-31899 discloses a method in which guanidine phosphate, melamine and ammonium polymetaphosphate are added to polyacetal resins. Further, JP-A-9-324105 teaches the incorporation of ammonium polyphosphate having a particle size of 30 μm or less either singly or with melamine in polyacetal resins. These methods, however, although capable of providing required flame retardancy to polyacetal resins, have the problem that the innate properties of polyacetal resins might be impaired greatly because of high loadings of the said additive materials.

Further, an idea of adding red phosphorus and a triazine-based compound to polyacetal resins to provide flame retardancy thereto is disclosed in JP-A-48-7044 and JP-B-55-35421. However, in this case, too, it is necessary to add a triazine-based compound such as melamine, guanidine phosphate or cyanoguanidine in a large quantity for obtaining satisfactory flame retardancy, and especially when melamine is used in bulk, there arise such problems as bleeding and mold deposition. JP-A-55-84348 proposes a polyacetal resin composition improved in flame retardancy by the combined use of red phosphorus and a molybdenum compound, but this composition is unsatisfactory in thermal stability and moldability.

On the other hand, incorporation of phenol resins or polycarbonate resins in polyacetal resins has been known in the art. For instance, JP-B-49-42662 teaches the addition of a phenol resin to polyacetal resins as an antioxidant. Also, JP-A-6-248163, JP-A-6-329873, JP-A-7-11101 and JP-A-7-292186 disclose methods featuring the addition of a phenol resin to a composition comprising a polyacetal resin and a polycarbonate, polystyrene, aliphatic polyether or aromatic polyether for improving the affinity and dispersibility of the polyacetal resin and thereby improving the mechanical properties and molding shrinkage of the composition. No disclosure has ever been made, however, regarding the improvement of flame retardancy by the incorporation of a phenol resin and/or a polycarbonate resin in polyacetal resins.

As viewed above, it is very difficult on account of their inherent characteristics to provide flame retardancy to polyacetal resins, and there is yet available no polyacetal resin composition which is possessed of both excellent innate properties of polyacetal resins and high flame retardancy.

SUMMARY OF THE INVENTION

The present invention is designed to provide a polyacetal resin composition which can be used even in the fields where the use of polyacetal resins has been limited because of their poor flame retardancy, by affording flame retardancy to polyacetal resins while maintaining their excellent innate properties.

In the course of research conceiving flame-retardant polyacetal resins, the present inventors found that it is possible to make the polyacetal resins flame-retardant without vitiating their innate properties by incorporating red phosphorus, a phenol resin and/or a polycarbonate resin and a thermal stabilizer in polyacetal resins, and completed the present invention on the basis of this finding.

Thus, the present invention concretely comprehends the following embodiments [1] to [11]:

[1] A flame-retardant polyacetal resin composition comprising (A) 60 to 90% by weight of a polyacetal resin, (B) 1 to 30% by weight of red phosphorus, (C) 1 to 40% by weight of at least one resin selected from the group consisting of phenol resins and polycarbonate resins, and (D) 0.1 to 5% by weight of a metal salt of a fatty acid as a thermal stabilizer.

[2] A resin composition set out in [1] above, wherein the red phosphorus is coated with an inorganic material and/or a resin.

[3] A resin composition set out in [1] or [2] above, wherein the red phosphorus has an average particle size of 0.1 to 100 μm.

[4] A resin composition set out in any one of [1] to [3] above, wherein the amount of red phosphorus in the whole composition is 5 to 15% by weight.

[5] A resin composition set out in any one of [1] to [4] above, wherein the component (C) is a novolak phenol resin having a weight-average molecular weight of 500 to 10,000.

[6] A resin composition set out in any one of [1] to [5] above, wherein the component (C) is a phenol resin modified with paraxylylene or alkylbenzene.

[7] A resin composition set out in any one of [1] to [6] above, wherein the component (C) is a phenol resin containing 5% by weight or less of unreacted phenol.

[8] A resin composition set out in any one of [1] to [7] above, wherein the metal salt (D) is at least one substance selected from the group consisting of alkaline metal salt of a fatty acid and an alkaline earth metal salt of a fatty acid.

[9] A resin composition set out in [8] above, wherein the metal salt (D) is a lithium salt of a fatty acid.

[10] A resin composition set out in [9] above, wherein the lithium salt is lithium stearate.

[11] A resin composition set out in any one of [1] to [10] above further comprising 5% by weight or less of (E) a silicon-based lubricant.

DETAILED DESCRIPTION OF THE INVENTION

A detailed description of the present invention follows.

The polyacetal resins usable as the component (A) in the present invention are not specified; it is possible to use, for instance, homopolymers obtained by homopolymerizing the monomers of formaldehyde, its trimer trioxane or its tetramer tetraoxane, with their molecular end closed with an ester or an ether; copolymers containing C2–C8 oxyalkylene units obtained by copolymerizing said trioxane or tetraoxane and cyclic ethers such as ethylene oxide, 1,3-dioxolane, 1,4-butanediol, etc.; block polymers obtained by introducing a different component segment such as polyoxyalkylene into the polyacetal backbone; branched polymers obtained by reacting a glycidyl ether, etc. with formaldehyde or trioxane to introduce a branch structure into the polyacetal backbone; and crosslinked polymers obtained by reacting a glycidyl ether, etc., with formaldehyde or trioxane for crosslinking of the polyacetal.

The amount of the polyacetal resin in the whole composition is 60 to 90% by weight, preferably 70 to 85% by weight.

The polymerization degree of the polyacetal resin used in the present invention is not subject to any restriction as long as it has the desired moldability. (For instance, its melt flow rate (MFR) at 190° C. under a load of 2,160 g can be 1 to 100).

Red phosphorus used as component (B) in the present invention is commercially available. The commonly used non-treated red phosphorus is self-ignited and also hydrolyzed to generate phosphine at about 260° C. Ordinary non-treated red phosphorus or stabilized red phosphorus which has been elevated to its self-ignition temperature by a surface treatment is used in the present invention.

Such surface-treated red phosphorus, to be specific, includes the following: red phosphorus coated with an inorganic material; red phosphorus coated with a resin; red phosphorus coated with an inorganic material and a resin; red phosphorus with a two-layer coating formed by first providing an inorganic material coating and then providing thereon a resin coating; and red phosphorus subjected to a surface treatment with various types of oil.

As referred to herein, the inorganic material include, without limitation, a metal such as iron, nickel, copper, aluminum, zinc, manganese, tin, titanium and zirconium; and a metal compound such as a metal hydroxide (aluminum hydroxide, magnesium hydroxide, calcium hydroxide, zinc hydroxide, titanium hydroxide, etc.) and a metal oxide (aluminum oxide, magnesium oxide, zinc oxide, titanium oxide, zirconium oxide, copper oxide, iron oxide, molybdenum oxide, tungsten oxide, manganese oxide, tin oxide, etc.). As coating and stabilization methods using the metal, a coating with the metal or its alloy by an electroless plating method and a formation of a metal phosphorus composition on the surface of red phosphorus by treating red phosphorus with a metal salt (aluminum, magnesium, zinc, titanium, copper, silver, iron or nickel salt) solution may be mentioned.

The resin which can be employed is, for example, a therosetting resin or a thermoplastic resin. Typical examples of the thermosetting resins include phenol resins, melamine resins, urea resins, alkyd resins, unsaturated polyester resins, epoxy resins, silicone resins and the like, and typical examples of the thermoplastic resins include polyester resins, polyamide resins, acrylic resins, olefin resins and the like.

In the present invention, stabilized red phosphorus coated with an inorganic material and/or a resin or stabilized red phosphorus having a two-layer coating of an inorganic material and a resin is preferably used, more preferably stabilized red phosphorus coated with a metal hydroxide such as magnesium hydroxide, aluminum hydroxide, zinc hydroxide or titanium hydroxide and/or a resin or stabilized red phosphorus having a two-layer coating of a metal hydroxide such as magnesium hydroxide, aluminum hydroxide, zinc hydroxide or titanium hydroxide and a resin.

Examples of such surface-treated red phosphorus are Novared 120, Novaexcel 140 and Novaexcel F5 (trade names) commercially available from Rin Kagaku Kogyo KK.

The particle size of red phosphorus used in the present invention is not specifically defined; no problem arises if its particle size is 200 μm or less, which is normal size, but it is preferable to use red phosphorus with a particle size of 0.1 to 100 μm, more preferably 1 to 50 μm. For the determination of particle size, for instance a method can be used in which a powder of red phosphorus is put into pure water and the average particle size is determined from the particle size distribution curve by using a laser refractory particle size analyzer manufactured by Cilas Co., Ltd.

The amount of red phosphorus in the whole composition is 1 to 30% by weight, preferably 5 to 15% by weight. If the amount of red phosphorus is less than 1% by weight, no satisfactory flame retardancy is provided, and if its amount exceeds 30% by weight, the produced composition is excessively deteriorated in its mechanical properties, especially impact resistance.

The phenol resin used as component (C) in the present invention can be obtained by reacting a phenol with formaldehyde. In the present invention, it is possible to use both of the novolak type phenol resins obtained by conducting the reaction in the presence of an acidic catalyst and the resol type phenol resins for which the reaction is carried out in the presence of an alkaline catalyst, but the use of novolak type phenol resins is preferred.

The molecular weight of the phenol resin used in the present invention is not specified, but preferably a phenol resin having a weight-average molecular weight of 500 to 10,000 is used.

The phenol resin used in the present invention is preferably one modified with paraxylylene or alkylbenzene, especially with alkylbenzene (modification rate: 40% or above).

In the phenol resins, usually several % of unreacted phenol is contained. In the present invention, it is preferable to use a phenol resin containing 5% by weight or less, more preferably 2% by weight or less of unreacted phenol. When a phenol resin with an unreacted phenol content exceeding 5% by weight is used, the thermal stability of the composition is lowered and also the smell of the unreacted phenol may present a problem.

Commercially available phenol resins such as Sumilight Resin PR-50731, PR-53647, PR-54443, R-54537 and PR-51992 by Sumitomo Durez Co., Ltd., and Phenol Resin CP-504 by Asahi Yikizai Kogyo KK can be used in the present invention.

No specific restrictions are imposed on the polycarbonate resin used as component (C) in the present invention; it is possible to use, for instance, the polycarbonate resins obtained from the reaction of divalent phenols and phosgene or from the ester exchange reaction of divalent phenols and diphenyl carbonate. Typical examples of the divalent phenols usable for the above reaction are the bisphenols, including but not limited to bisphenol A (2,2-bis(4-hydroxyphenyl) propane), hydroquinone, 4,4'-dihydroxyphenyl, bis(4-hydroxyphenyl)alkane, bis(4-hydroxyphenyl) sulfide, bis(4-hydroxyphenyl)cycloalkane, and bis(4-hydroxyphenyl) sulfone. Homopolymers of these divalent phenols and copolymers of two or more types of divalent phenols are also usable.

As the polycarbonate resin in the present invention, it is possible to use the copolymers of polycarbonates such as polyester carbonate and the branched polycarbonate resins.

Examples of such polycarbonate resins are the commercial products Panlite L-1225 (trade name) by Teijin Kasei Co., Ltd., and Iupilon S2000, S2000R, S3000 and S3000R (trade name) by Mitsubishi Engineering Plastics Co., Ltd.

The amount of the component (C) in the whole composition is 1 to 40% by weight, preferably 5 to 20% by weight. If the amount of the component (C) is less than 1% by weight, it is impossible to obtain the desired flame retardancy, and if its amount exceeds 40% by weight, although satisfactory flame retardancy can be obtained, the innate mechanical properties of the polyacetal resins are impaired.

The metal salt of a fatty acid used as component (D) (thermal stabilizer) in the present invention is at least one compound selected from the group consisting of an alkali metal salt of a fatty acid and an alkaline earth metal salt of a fatty acid.

Examples of the alkali metal fatty acid salt and the alkaline earth metal salt are calcium dimyristate, calcium dipalmitate, calcium diheptadecylate, calcium distearate, calcium (myristate-palmitate), calcium (myristate-stearate), calcium (palmitate-stearate), lithium myristate, lithium palmitate, lithium heptadecylate and lithium stearate. Of these compounds, a lithium salt of a fatty acid such as lithium palmitate and lithium stearate; and a calcium salt of a fatty acid such as calcium distearate are preferred, and lithium stearate are especially preferred. These compounds may be used either singly or as a mixture of two or more of them.

The amount of the thermal stabilizer in the whole composition is 0.1 to 5% by weight, preferably 0.15 to 3% by weight. If the amount of the thermal stabilizer is less than 0.1% by weight, the desired thermal stability may not be obtained due to the influence of phosphoric acid generated from the decomposition of red phosphorus or unreacted phenol in the phenol resin. If the amount of the thermal stabilizer exceeds 5% by weight, flame retardancy is impaired.

The composition according to the present invention may further contain (E) a silicon-based lubricant in addition to the said components (A) to (D). The silicon-based lubricant used in the present invention may be optionally selected from the known silicon compounds and their modified products. These silicon compounds may be used by combining two or more of them. Further, for the sake of convenience of handling, these silicon compounds may be mixed with other resins (thermoplastic resins, e. g. olefin resins such as polyethylene and polypropylene, and polyacetal resins) and pelletized for use as a masterbatch, or the silicon compounds may be grafted to other resins (polyolefin resins such as polyethylene and polypropylene).

As the polyolefin resin to which a silicon compound is to be grafted, there can be used, for instance, low-density polyethylenes (LDPE), high-density polyethylenes, ethylene-vinyl acetate copolymer, and ethylene-methyl methacrylate copolymer (EMMA).

Examples of the silicon-based lubricants usable in the present invention include silicon gum masterbatch (40% polyacetal/60% silicon) available from Shin-Etsu Chemical Industries Co., Ltd., and Master Pellets SP-100 (60% silicon–40% EMMA graft), SP-300 (40% silicon–60% LDPE graft), SP-350 (50% silicon–50% LDPE graft, etc.) available from Dow Corning Asia, Ltd.

In case of blending a silicon-based lubricant, its amount in the whole composition is preferably defined to be 5% by weight or less. Its use in excess of 5% by weight may cause a deterioration of mold releasability, flame retardancy and mechanical properties of the composition.

In the composition of the present invention, it is possible to add the known additives for providing the desired specific properties according to the purpose of use of the composition, within limits not prejudicial to the object of the invention. Such additives include antioxidants (hindered phenol type, etc.), release agents (ethylene-bis-amide, etc.), lubricants, antistatic agents, ultraviolet absorbers, light stabilizers, etc. It is also possible to add fillers such as glass fibers, carbon fibers, calcium carbonate, etc.

The composition of the present invention can be obtained by mixing the component materials with a commonly employed melt mixer such as a single-screw extruder, double-screw extruder, kneader, etc.

According to the present invention, red phosphorus, a phenol resin and/or a polycarbonate resin, and a thermal stabilizer are supplied into a melt mixer along with a polyacetal resin and thereby melted and mixed (kneaded), but the method of addition and the method of mixing (kneading) are not specified; it is possible to employ the known methods which suit the situation. For example, red phosphorus powder, a phenol resin and/or a polycarbonate resin, a thermal stabilizer, etc., may be mixed together with a polyacetal resin, the mixture being then extruded and pelletized.

In another method, red phosphorus and a thermal stabilizer are once added to a polyacetal resin to form masterbatch pellets, and these masterbatch pellets are mixed with a phenol resin and/or a polycarbonate resin, a thermal stabilizer, etc., the mixture being then extruded and pelletized.

Red phosphorus has the property that it is easily ignited when an impact or frictional force is given thereto, so that a great deal of care is required for handling of powdery red phosphorus. For facilitating handling of red phosphorus, it is preterred to form masterbatch pellets of red phosphorus with a polyacetal resin as mentioned above. This method can greatly facilitate the handling of powdery red phosphorus.

The polyacetal resin composition of the present invention is provided with flame retardancy while maintaining the excellent innate properties of polyacetal resins, so that it can be applied to the fields where its use has been considered difficult, such as the fields of automobile parts and OA equipment parts.

DESCRIPTION OF PREFERRED EMBODIMENTS

The present invention will be further illustrated by showing the examples thereof. The component materials used in the Examples and the Comparative Examples are as described below.

(A) Polyacetal resin

TENAC C (trade name) 4520 produced by Asahi Kasei Kogyo K.K.; MI=10 g/10 min (B) Red phosphorus (B1): Novaexcel 140 produced by Rin Kagaku Kogyo KK;

an inorganic material/resin two-layer coating;

average particle size=40 $\mu$m (B2): Novared 120 produced by Rin Kagaku Kogyo KK;

an inorganic material/resin mixture coating;

average particle size=30 $\mu$m (C) Phenol and polycarbonate resins Phenol resins (C1): PR-50731 produced by Sumitomo Durez Co., Ltd.;

Novolak type, weight-average molecular weight: 7,600;

unreacted phenol=2%

(C2): R-54537 produced by Sumitomo Durez Co., Ltd.;

Novolak type, weight-average molecular weight: 3,400;

unreacted phenol<2%; 65% modified with alkylbenzene

Polycarbonate resin (C2): Panlite L1225 produced by Teijin Kasei Co., Ltd.

(D) Thermal stabilizers
(D1): lithium stearate produced by Nippon Yushi KK
(D2): melamine produced by Nissan Chemical Co., Ltd.; average particle size=1 micron
(D3): nylon 12 (Diamid L-1700) produced by Daicel Chemical Industries, Ltd.
(E) Silicon-based lubricant
SP-350, master pellets produced by Dow Corning Asia, Ltd.

The evaluation of flame retardancy, properties and thermal stability in the following Examples and Comparative Examples was made by the methods described below.

(1) Flame retardancy

Five 127×12.7×3 mm test pieces were left in an atmosphere of 23° C. and 50% RH for 2 days and then brought into contact with the flames according to the UL Flame Resistance Test Standards (UL 94 ranking: HB, V-2, V-1, V-0), and the ranking of the test pieces by the same Standards was made based on the combustion time after each of 2 times of contact with the flames and the total combustion time after 10 times of contact with the flames.

(2) Flexural modulus

The test pieces were made using an injection molding machine IS-100E (Toshiba Corp.) under the following conditions: cylinder temperature=200° C.; injection pressure=6 MPa; injection time=25 seconds; cooling time=15 seconds; mold temperature=70° C., and their flexural modulus was determined according to ASTM-D790.

(3) Izod impact strength

The test pieces were made using the above-mentioned injection molding machine (Toshiba IS-100E) under the following conditions: cylinder temperature=200° C.; injection pressure=6 MPa; injection time=25 seconds; cooling time=15 seconds; mold temperature=70° C., and they were notched and subjected to an Izod impact test according to ASTM-D256.

(4) Thermal stability

Each specimen was melted by heating at 230° C. in a stream of nitrogen and the formaldehyde generated in the period of 30 minutes was absorbed into a sodium sulfite solution and titrated with a sulfuric acid solution.

EXAMPLE 1

68% by weight of polyacetal resin (A), 30% by weight of red phosphorus (B1) and 2% by weight of thermal stabilizer (D1) were blended and pelletized by a double-screw extruder (PCM-30 mfd. by Ikegai Iron Works, Ltd.) at 190° C. to obtain a 30% red phosphorus masterbatch. In this masterbatch, polyacetal resin (A), phenol resin (C1) and thermal stabilizer (D1) were blended so that the component contents in the whole composition would become 83% by weight (A), 10% by weight (B1), 6% by weight (C1) and 1% by weight (D1), respectively, and the blend was pelletized by the double-screw extruder (Ikegai Iron Works PCM-30) at 190° C. The obtained pellets were molded into the test pieces and these test pieces were left in a room controlled at 23° C. and 50% RH for 2 days and then subjected to the determinations of flame retardancy, flexural modulus and Izod impact strength. Thermal stability of the pellets was also determined. Evaluation results are shown in Table 1.

EXAMPLE 2

83% by weight of polyacetal resin (A), 10% by weight of red phosphorus (B1), 6% by weight of phenol resin (C1) and 1% by weight of thermal stabilizer (D1) were blended and pelletized by the double-screw extruder (Ikegai Iron Works PCM-30) at 190° C. The obtained pellets were molded into test pieces, and these test pieces were left in a room controlled at 23° C. and 50% RH for 2 days and then subjected to the determinations of flame retardancy, flexural modulus and Izod impact strength. Evaluation results are shown in Table 1.

EXAMPLES 3 to 7

Test pieces were made in the same way as in Example 1 except that the type and amount of the phenol resin, flame retardant and thermal stabilizer were changed as shown in Table 1, and they were evaluated as in Example 1. Evaluation results are shown in Table 1.

EXAMPLE 8

Test pieces were made in the same way as in Example 4 except that 2% by weight of a silicon-based lubricant (E) was further added to the master batch, and they were evaluated as in Example 1. Results are shown in Table 1.

Comparative Examples 1 to 15

Test pieces were made in the same way as in Example 1 except that the type and composition of the phenol resin, flame retardant and thermal stabilizer were changed as shown in Table 2, and they were evaluated as in Example 1. Results are shown in Table 2.

TABLE 1

| | POLY-ACETAL RESIN | RED PHOSPHORUS | | PHENOL RESIN (C1, C2) POLYCARBONATE RESIN (C3) | |
|---|---|---|---|---|---|
| | wt % | TYPE | wt % | TYPE | wt % |
| EXAMPLE 1 | 83.0 | (B1) | 10 | (C1) | 6 |
| EXAMPLE 2 | 83.0 | (B1) | 10 | (C1) | 6 |
| EXAMPLE 3 | 83.0 | (B2) | 10 | (C1) | 6 |
| EXAMPLE 4 | 83.0 | (B1) | 10 | (C2) | 6 |
| EXAMPLE 5 | 79.0 | (B1) | 10 | (C3) | 10 |
| EXAMPLE 6 | 76.0 | (B1) | 10 | (C1)/(C3) | 5/8 |
| EXAMPLE 7 | 76.0 | (B1) | 10 | (C2)/(C3) | 5/8 |
| EXAMPLE 8 | 81.0 | (B1) | 10 | (C2) + (E) LUBRICANT | 6 +2 |

| THERMAL STABILIZER | | FLEXURAL MODULUS | IZOD IMPACT STRENGTH | THERMAL STABILITY | UL94 |
|---|---|---|---|---|---|
| TYPE | wt % | GPa | J/m | ppm | RANKING |
| (D1) | 1 | 2.57 | 35 | 200 | V-1 |
| (D1) | 1 | 2.53 | 34 | 150 | V-1 |
| (D1) | 1 | 2.46 | 34 | 240 | V-1 |
| (D1) | 1 | 2.46 | 35 | 180 | V-1 |
| (D1) | 1 | 2.50 | 35 | 170 | V-1 |
| (D1) | 1 | 2.45 | 33 | 210 | V-1 |
| (D1) | 1 | 2.51 | 35 | 170 | V-1 |
| (D1) | 1 | 2.45 | 34 | 200 | V-1 |

TABLE 2

| | POLY-ACETAL RESIN | RED PHOSPHORUS | | PHENOL RESIN (C1, C2) POLYCARBONATE RESIN (C3) | |
|---|---|---|---|---|---|
| | wt % | TYPE | wt % | TYPE | wt % |
| COMP. EXAMPLE 1 | 99 | — | 0 | — | 0 |
| COMP. EXAMPLE 2 | 89.9 | (B1) | 10 | — | 0 |
| COMP. EXAMPLE 3 | 79.0 | (B1) | 20 | — | 0 |

TABLE 2-continued

| | | | | | |
|---|---|---|---|---|---|
| COMP. EXAMPLE 4 | 89.0 | — | 0 | (C1) | 10 |
| COMP. EXAMPLE 5 | 89.0 | — | 0 | (C2) | 10 |
| COMP. EXAMPLE 6 | 89.0 | — | 0.1 | (C3) | 10 |
| COMP. EXAMPLE 7 | 88.9 | (B1) | 0.1 | (C2) | 10 |
| COMP. EXAMPLE 8 | 88.9 | (B1) | 40 | (C3) | 10 |
| COMP. EXAMPLE 9 | 53.0 | (B1) | 40 | (C2) | 6 |
| COMP. EXAMPLE 10 | 53.0 | (B1) | 15 | (C3) | 6 |
| COMP. EXAMPLE 11 | 83.5 | (B1) | 15 | (C2) | 0.5 |
| COMP. EXAMPLE 12 | 83.5 | (B1) | 15 | (C3) | 0.5 |
| COMP. EXAMPLE 13 | 39.0 | (B1) | 15 | (C2) | 45 |
| COMP. EXAMPLE 14 | 39.0 | (B1) | 15 | (C3) | 45 |
| COMP. EXAMPLE 15 | 84.0 | (B1) | 10 | (C1) | 6 |

| THERMAL STABILIZER TYPE | wt % | FLEXURAL MODULUS GPa | IZOD IMPACT STRENGTH J/m | THERMAL STABILITY ppm | UL94 RANKING |
|---|---|---|---|---|---|
| (D1) | 1 | 2.65 | 60 | 100 | HB |
| (D1) | 0.05 | 2.83 | 37 | 2300 | HB |
| (D1) | 1 | 3.25 | 21 | 490 | HB |
| (D1) | 1 | 2.05 | 55 | 380 | HB |
| (D1) | 1 | 2.10 | 55 | 290 | HB |
| (D1) | 1 | 2.60 | 36 | 280 | HB |
| (D1) | 1 | 2.02 | 55 | 220 | HB |
| (D1) | 1 | 2.65 | 35 | 220 | HB |
| (D1) | 1 | 2.75 | 17 | 1510 | V-1 |
| (D1) | 1 | 2.85 | 17 | 1350 | V-1 |
| (D1) | 1 | 2.75 | 43 | 300 | HB |
| (D1) | 1 | 2.72 | 45 | 280 | HB |
| (D1) | 1 | 1.21 | 16 | 370 | V-1 |
| (D1) | 1 | 2.28 | 16 | 230 | V-1 |
| (D1) | 0 | 2.56 | 35 | 780 | V-1 |

What is claimed is:

1. A flame-retardant polyacetal resin composition comprising (A) 60 to 90% by weight of a polyacetal resin, (B) 1 to 30% by weight of red phosphorus coated with an inorganic material and/or a resin, (C) 1 to 40% by weight of at least one resin selected from the group consisting of phenol resins and polycarbonate resins, and (D) 0.1 to 5% by weight of an alkali metal or an alkaline earth metal salt of a fatty acid as a thermal stabilizer.

2. A resin composition according to claim 1, wherein the red phosphorus is coated with a metal hydroxide and/or a resin.

3. A resin composition according to claim 1, wherein the red phosphorus has an average particle size of 0.1 to 100 μm.

4. A resin composition according to any one of claims 1 to 3, wherein the amount of red phosphorus in the whole composition is 5 to 15% by weight.

5. A resin composition according to claim 1, wherein the component (C) is a novolak phenol resin having a weight-average molecular weight of 500 to 10,000.

6. A resin composition according to claim 1, wherein the component (C) is a phenol resin modified with paraxylylene or alkylbenzene.

7. A resin composition according to claim 1, wherein the component (C) is a phenol resin containing 5% by weight or less of unreacted phenol.

8. A resin composition according to claim 1, wherein the metal salt (D) is a lithium salt of a fatty acid.

9. A resin composition according to claim 8, wherein the lithium salt is lithium stearate.

10. A resin composition according to claim 1 further comprising 5% by weight or less of (E) a silicon-based lubricant.

11. A resin composition according to claim 1, wherein the red phosphorus is coated with an inorganic material/resin two-layer coating.

12. A resin composition according to claim 1, wherein the red phosphorus is coated with an inorganic material/resin mixture coating.

* * * * *